United States Patent [19]
Okada et al.

[11] Patent Number: 5,106,147
[45] Date of Patent: Apr. 21, 1992

[54] AUTOMOTIVE SPOILER

[75] Inventors: Makoto Okada; Tetsumi Ichioka, both of Inazawa, Japan

[73] Assignee: Toyoda Gosei Co., Ltd., Nishikasugai, Japan

[21] Appl. No.: 713,527

[22] Filed: Jun. 12, 1991

[30] Foreign Application Priority Data

Jun. 14, 1990 [JP] Japan ................... 2-155646

[51] Int. Cl.$^5$ ............................. B62D 37/02
[52] U.S. Cl. ................................. 296/180.1
[58] Field of Search ..................... 296/180.1, 180.2

[56] References Cited

U.S. PATENT DOCUMENTS

| | | | |
|---|---|---|---|
| 4,406,491 | 9/1983 | Forster | 296/180.3 |
| 4,558,898 | 12/1985 | Deaver | 296/180.1 |
| 4,635,991 | 1/1987 | Parna | 296/180.1 |
| 5,013,081 | 5/1991 | Cronce et al. | 296/180.1 |

FOREIGN PATENT DOCUMENTS 1-15578  5/1989  Japan.

Primary Examiner—Robert R. Song
Attorney, Agent, or Firm—Cushman, Darby & Cushman

[57] ABSTRACT

An automotive spoiler includes a spoiler body, a spoiler stay and a stay cover, all of which are formed separately by injection molding. The stay includes at least one upright tubular spoiler body mounting portion having a closed upper end defining a mounting seat having a mounting hole and an open lower end integral with a vehicle-side mounting portion. The stay cover is secured and disposed between the spoiler body mounting portions and the spoiler body and has a skirt covering the stay.

4 Claims, 4 Drawing Sheets

AUTOMOTIVE SPOILER

FIELD OF THE INVENTION

The present invention relates to an automotive spoiler having a spoiler stay separately molded from a spoiler body formed through blow molding for mounting the spoiler body on an autmotive vehicle body.

BACKGROUND OF THE INVENTION

To maintain stability of an automotive vehicle, particularly at high speed, a wing-shaped spoiler has often been provided at a rear part of the vehicle (see Japanese Utility Model Examined Publication No. 1-15578). To meet the demands of various designs of the vehicles, there have been greater demands for various designs of spoilers.

However, in spoilers in which a stay portion is formed integral with a spoiler body through blow molding, it is difficult to obtain an under-cut shape of the stay portion, i.e., a shape wherein the stay portion diverges toward its vehicle-mounting portion.

For this reason, in order to ensure a sufficient mounting strength relative to the vehicle body, the freedom of design is limited to one wherein both ends of the spoiler body are fixed to the vehicle body or the stay portion is enlarged in size.

SUMMARY OF THE INVENTION

Accordingly, in order to overcome the above-noted difficulty, an object of this invention is to provide an autmotive spoiler which ensures a sufficient mounting strength relative to the vehicle body even if the dimensions of the stay portion are small, while increasing the degree of freedom of design.

According to this invention, in order to attain the above-described and other objects, there is provided an automotive spoiler comprising a spoiler body, a spoiler stay and a stay body cover, all of which are formed separately from each other by injection molding. The stay includes upright generally tubular portions each having a closed upper end to form a mounting seat with a mounting hole for the spoiler body and an open lower end attached to a vehicle-mounting portion. The stay cover has a mounting hole and is secured and disposed between the spoiler body and its mounting seat on the stay.

Further, the invention includes first mounting members secured on the spoiler body by insert molding and second mounting members adapted to be inserted through the mounting holes from the side thereof opposite the spoiler body, with the first and second mounting members cooperating with each other to fasten the spoiler body and the stay cover to the stay.

The the invention also includes vehicle-mounting members secured on vehicle mounting portion of the stay by insert molding.

In further aspect of the invention, the tubular portion of the stay are provided at two locations in a direction transverse to the length of the spoiler body and the stay includes reinforcement ribs extending between the tubular portions.

DETAILED DESCRIPTION OF THE PREFERRED EMBODIMENTS

Figure 3:
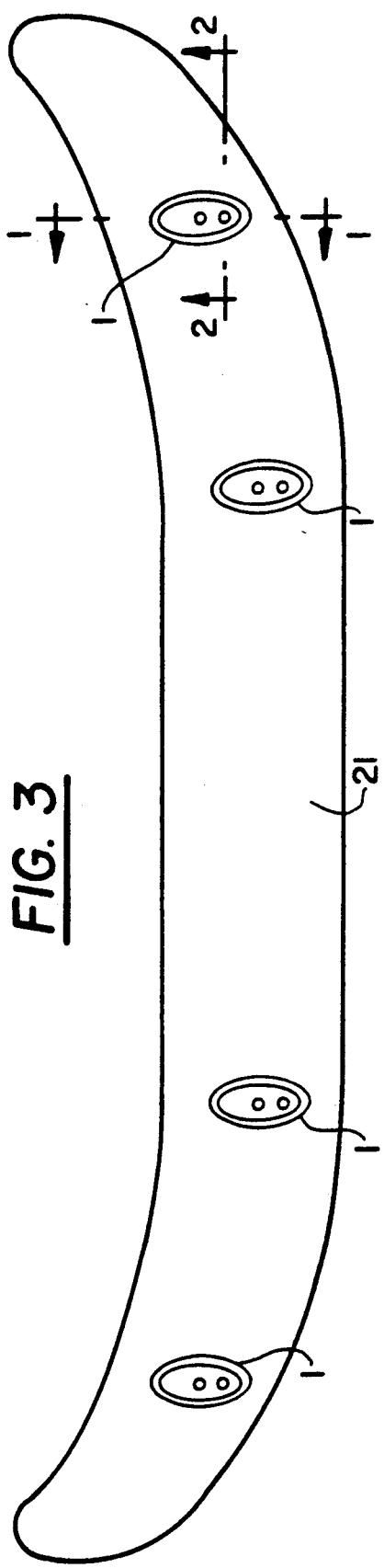
FIG. 3 is a bottom view showing the spoiler body with a stay assembled thereto in accordance with this invention.

It is a premise of an embodiment of this invention that a spoiler stay 1 (FIG. 3) is used for mounting a separate blow-molded spoiler body 21 onto an automotive vehicle The blow molding is not limited to extrusion blow molding or injection blow molding and the molding material is selected from synthetic resins having a good shock-proof property, such as polyacetal and ABS resin.

In a recessed stay mounting portion 23 (FIGS. 1 and 2) of the spoiler body 21, there is integrally formed one part of two screw pairs, i.e., a nut 25 (in the shown embodiment), formed through insert molding. If necessary, a metallic reinforcement member may be further inserted into this portion.

The spoiler includes a stay 3 and a stay cover 11 which are separately formed through injection molding. It is possible to use the same material to form the stay 3 and the stay cover 11 through injection molding. However, it is preferable to use different materials as follows.

For instance, as respects mechanical strength, the stay 3 is made of materials having a high strength such as polyamide resin, polyphenylene oxide and fiber reinforced materials. As respects shock-proof property and vibration absorbing property, the stay cover 11 is made of a thermoplastic elastomer such as polyolefine system, polyamide system and polyester system.

Figure 1:
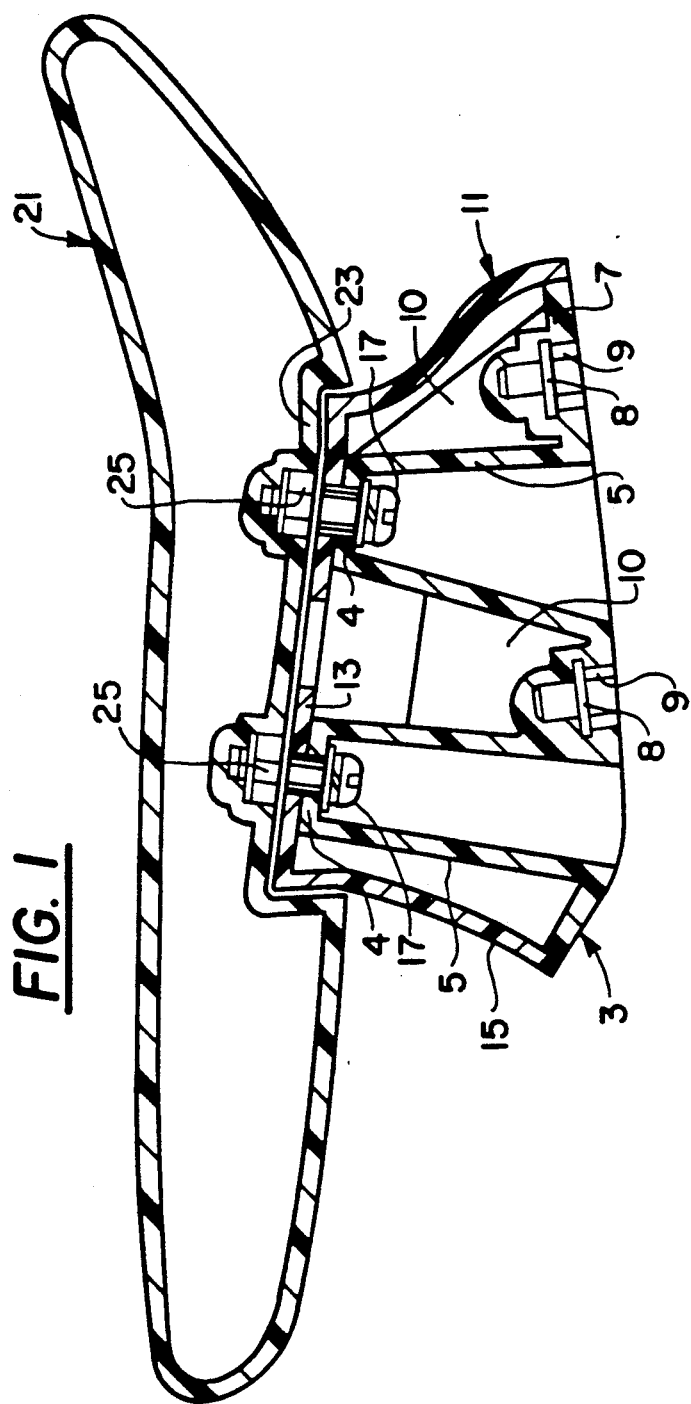
FIG. 1 is a cross-sectional view taken along the line I—I of FIG. 3, showing a spoiler in accordance with one embodiment of the invention.
Figure 5:
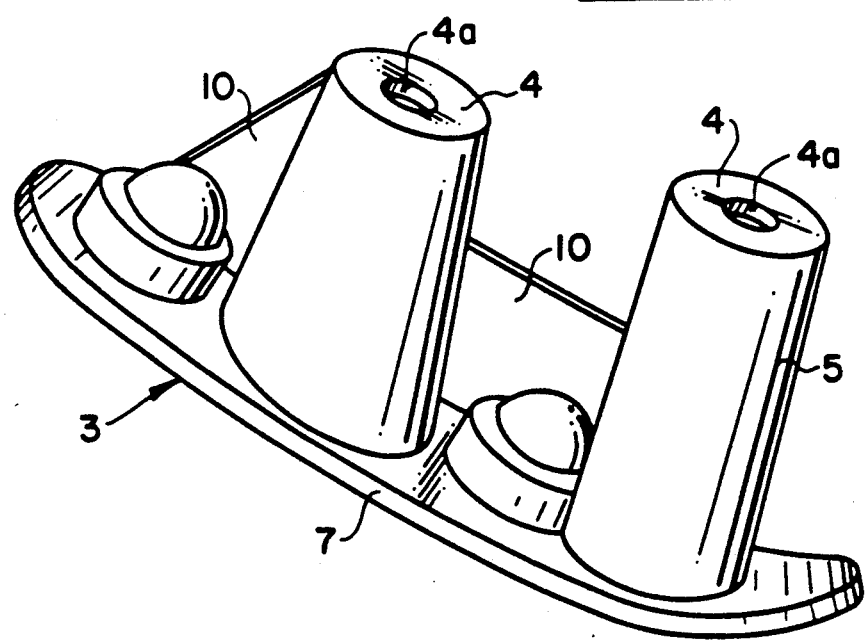
FIG. 5 is a perspective view of the stay shown in FIG. 1.

As best shown in FIG. 5, the stay 3 has a spoiler body mounting portion 5 which is generally tubular, i.e. in the form of an upright truncated cone having a closed upper end defining a mounting seat portion 4 with a bolt hole 4a and an open lower end integral with a vehicle mounting portion 7 Turning back to FIG. 1, one part of a screw pair, i.e. a nut 9 with a washer 8, is formed through insert molding into the vehicle mounting portion 7. Also as shown in FIGS. 1 and 5, two truncated-conical i.e. tubular, portions 5 are provided to mount the spoiler body 21 and reinforcement ribs 10 are formed along and between the truncated-conical portions 5.

Figure 2:
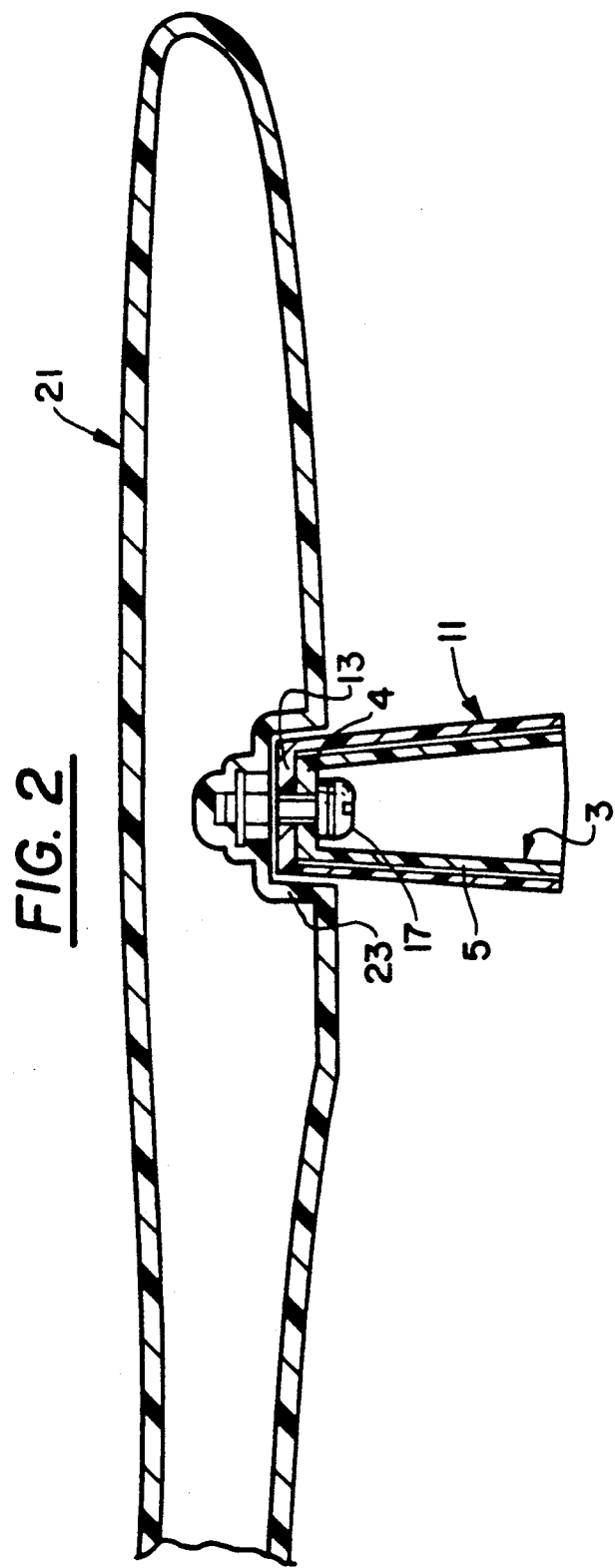
FIG. 2 is a fragmentary cross-sectional view taken along the line II—II of FIG. 3.
Figure 4:
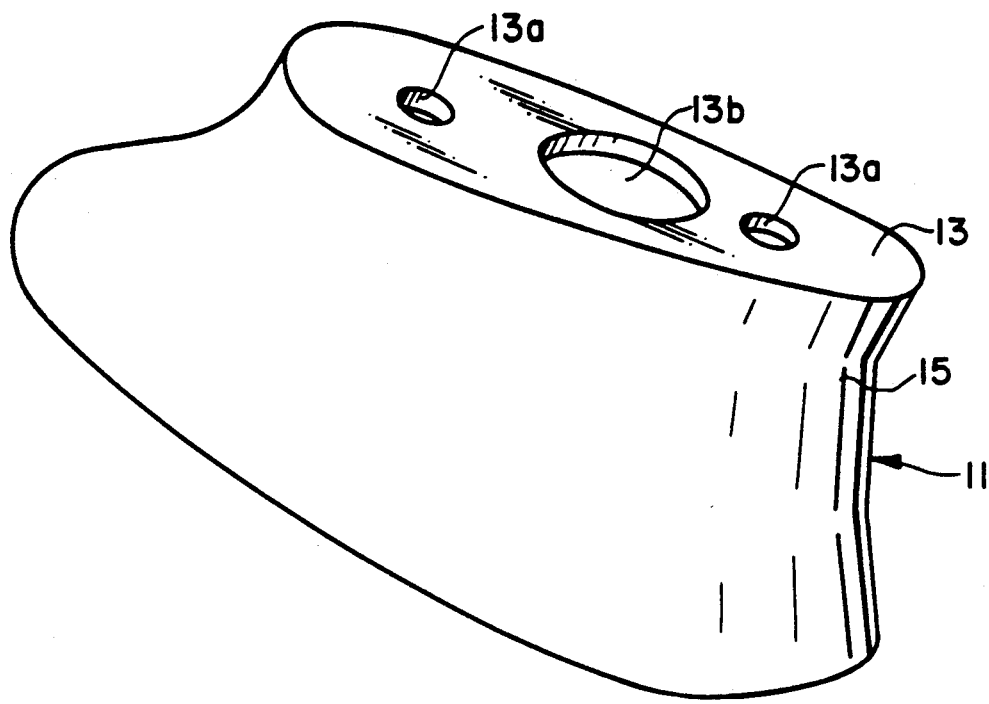
FIG. 4 is a perspective view showing a stay cover according to this invention.

As shown in FIG. 2, the stay body 3 and the stay cover 11 are fastened together to the spoiler body 21 by the other part of the first mention screw-pair, i.e., a small bolt 17 engaging in the nut 25. As shown in FIG. 4, the stay cover 11 is formed with a ceiling portion 13 clamped between the mounting portion 23 of the spoiler body 21 and the mounting seat portion 4 of the stay 3, for effecting a shock absorbing effect, and a skirt portion 15 diverging from the periphery of the ceiling portion 13 for covering the stay 3. In FIG. 4, the reference character 13a denotes holes for the screw 17 and 13b denotes an electric power wiring hole for a stop lamp (not shown) formed at the rear edge of the spoiler body 21.

In the foregoing embodiment, the stay 3 and the stay cover 11 are fastened together to the spoiler body 21 by the bolts 17. It is, however, possible to integrally fasten the two components by using other fastening means such as a rivet and a clip (not shown).

As described above, the spoiler body 21 to which the stay 1 has been assembled is mounted by bolts (not shown) onto a rear portion of a vehicle (not shown), i.e., a trunk lid, by, for example, fastening bolts to the nuts 9 secured to the vehicle mounting portion 7 of the stay 3 in the conventional manner.

Since the spoiler stay according to this invention has the above-described structure, even if its dimensions are small, it is possible to readily ensure adequate mounting strength relative to the vehicle body. Accordingly, it is possible to increase the degree of freedom of design of the stay for the spoiler, and it is easy to meet the demands of various designs of the spoiler.

What is claimed is:

1. An automotive spoiler comprising:
   a separate wing-shaped spoiler body;
   a separate body-mounting stay adapted to be secured to an automotive vehicle and to have said spoiler body secured thereto; and
   a separate stay cover adapted to be secured between said spoiler body and said mounting stay,
   said cover being generally of inverted cup-shaped configuration with a ceiling portion and a skirt portion to cover said stay, said stay having an upright generally tubular spoiler body-mounting portion with a closed upper end forming a body-mounting seat with a mounting hole therethrough to receive a mounting member for securing said body to said stay and an open lower end provided with a vehicle-mounting portion, said ceiling portion being adapted to be secured between said spoiler body and said seat and having a mounting hole therethrough for receiving the mounting member.

2. An automotive spoiler as set forth in claim 1, further comprising a first mounting member secured on said spoiler body by insert molding and a second mounting member adapted to be inserted through said stay mounting hole from the side thereof opposite said spoiler body, said first and second mounting members cooperating with each other to fasten said spoiler body and said stay cover to said stay.

3. An automotive spoiler as set forth in claim 1, further comprising a mounting member secured on said vehicle mounting portion of said stay by insert molding.

4. An automotive spoiler as set forth in claim 1, wherein the stay has two spoiler body mounting portions located along a line transverse to the length of said spoiler body and further comprising reinforcement ribs extending along and between said spoiler body mounting portions.

* * * * *